May 13, 1947. E. S. BRISTOL 2,420,415
CONTROL SYSTEM
Filed Oct. 17, 1942
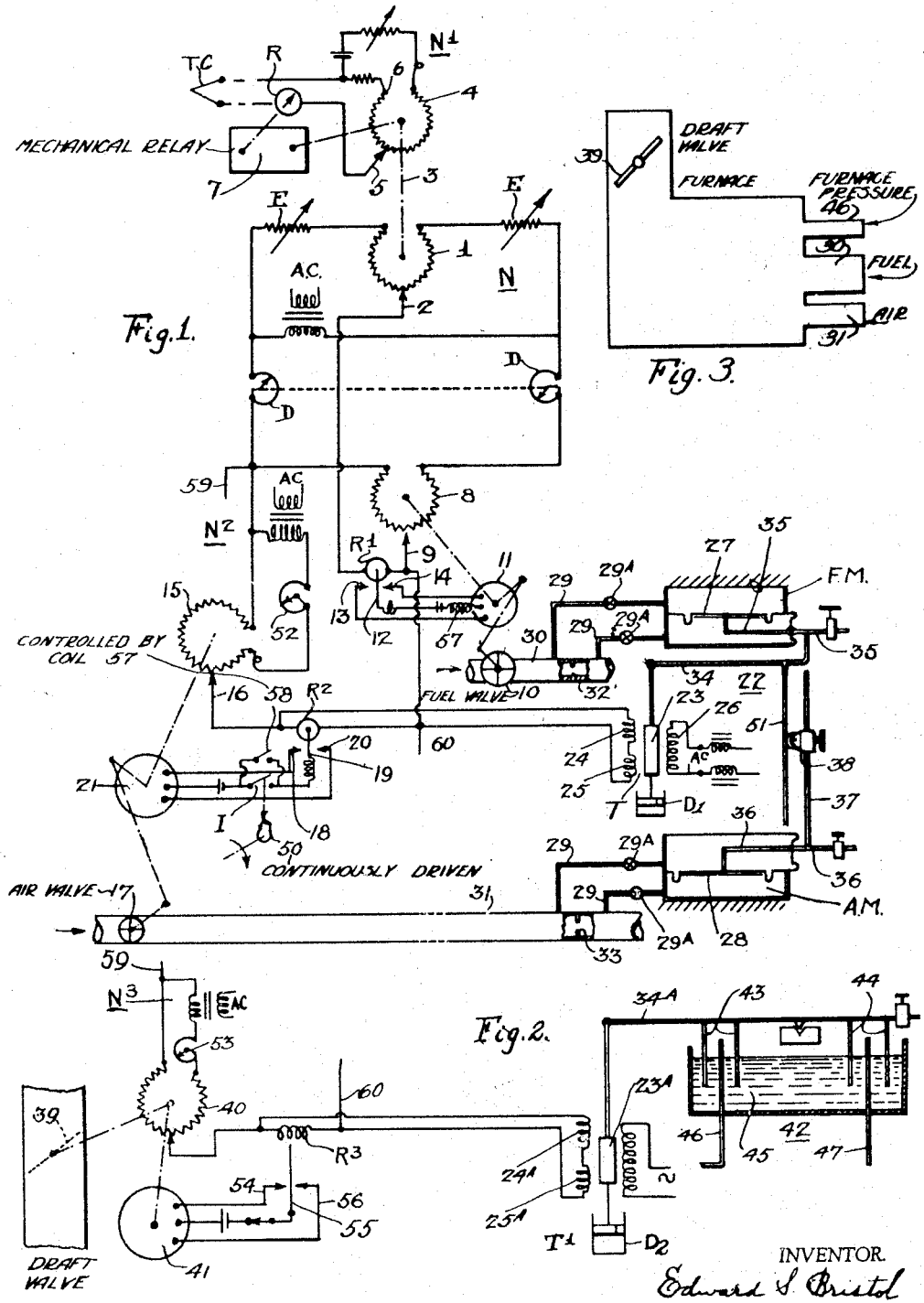

Patented May 13, 1947

2,420,415

UNITED STATES PATENT OFFICE 2,420,415

CONTROL SYSTEM

Edward S. Bristol, Philadelphia, Pa., assignor to Leeds and Northrup Company, Philadelphia, Pa., a corporation of Pennsylvania Application October 17, 1942, Serial No. 462,367

11 Claims. (Cl. 236—15)

My invention relates to control systems for varying the rate or rates of application or supply of two or more agents in response to changes in magnitude of a condition and for maintaining predetermined relation or relations between the rates of application of the agents; more particularly, the invention relates to systems suited to regulate the supply of fuel and air to a furnace to maintain a predetermined temperature and a predetermined relation of the rates of supply of air and fuel.

In accordance with my invention, the adjustable elements of air and fuel valves, for example, are each primarily adjusted to extents corresponding with changes in magnitude of temperature or other condition to be controlled, and one of them is further adjusted to maintain a predetermined relation between the actual or metered rates of supply of the air and fuel.

More particularly, aforesaid adjustable elements are respectively movable with impedances of a balanceable network and the actuating means of one of them is controlled by means responsive to unbalance of the network and to an electrical effect varying with variations of the ratio to each other of the rates of supply of air and fuel.

My invention further resides in systems having the features of operation, construction and arrangement hereinafter described.

For an understanding of my invention reference is made to the accompanying drawings in which:

Fig. 1 schematically illustrates a system for controlling the rates of supply of fuel and air to a furnace;

Fig. 2 is a diagram of control apparatus utilizable in association with Fig. 1; and Fig. 3 is a schematic representation of a furnace and adjuncts.

The balanceable network N includes the slidewire 1 whose position with respect to its contact 2 is made to correspond with the existing magnitude of the condition to be controlled, for example pressure, temperature, ion-concentration or other condition. For purposes of illustration, it is assumed in further description that the relative position of slidewire 1 and contact 2 represents or corresponds with temperature, for example the temperature of a furnace chamber or of some medium whose temperature varies as a function of the furnace temperature. The end coils or resistances E are of magnitudes selected or adjusted to obtain a desired correlation of the range of variation of potential of contact 2 and the range of temperature variation measurable by network N1.

Preferably the adjustment of slidewire 1 is effected by mechanical relay mechanism of the type discussed in U. S. Letters Patent 1,935,732 to Squibb. More particularly the slidewire 1 is mounted upon shaft 3 for adjustment in unison with the potentiometer slidewire 4 of the temperature-measuring network N1.

Upon change in magnitude of the temperature to which the thermocouple TC, or equivalent temperature-responsive device is exposed, the galvanometer R deflects in response to the difference between the voltage produced by the thermocouple and the effective voltage of the slidewire 4 between its contact 5 and terminal 6. In response to deflection of the galvanometer, the mechanical relay 7, of the aforesaid Squibb or equivalent type, effects movement of slidewire 4 in sense and extent required to restore balance of network N1.

Concurrently with aforesaid rebalancing adjustment of slidewire 4, slidewire 1 is moved with respect to contact 2 to an extent corresponding with the change in temperature, thus unbalancing the control network N which includes slidewire 8 whose position with respect to its contact 9 corresponds with or represents the position of the adjustable element of the fuel valve 10, or equivalent control member.

When the bridge network N is unbalanced by adjustment of slidewire 1, the difference between the potentials of contacts 2 and 9, representative respectively of temperature and fuel valve position, is impressed upon an electro-responsive device, exemplified by the galvanometer or relay R1, to effect energization of the reversible motor 11, or equivalent, suitably coupled to the valve 10 and the slidewire 8. Motor 11 may, for example, be of the split field type whose field sections are selectively connected to its armature by the reversing switch comprising the relay contacts 12, 13 and 14.

The electrical connections between the reversing switch and the motor 11 and the mechanical connections between the motor 11, slidewire 8 and valve 10 are such that the slidewire 8 is adjusted by motor 11 in sense to restore balance of network N and simultaneously with that slidewire adjustment valve 10 is adjusted concurrently with valve 17, individually controlled as hereinafter described, in direction to reduce or oppose the change in temperature.

Slidewire 8 is included in a second control network N2 which includes the potentiometer slidewire 15 whose position with respect to its contact 16 corresponds with or represents the position of the adjustable element of the air valve 17 or equivalent control member. The difference between the potentials of the contacts 9 and 16, of magnitudes corresponding with the positions of the fuel and air valves respectively, is impressed upon an electro-responsive device exemplified by relay or galvanometer R2 whose contacts 18, 19 and 20 constitute a reversing switch for the motor 21 suitably mechanically coupled to the adjustable elements of slidewire 15 and valve 17 to effect their adjustment in unison.

The electrical and mechanical connections to motor 21 are such that in response to unbalance of network N2 as detected by relay R2, the slidewire 15 is rotated in direction and to extent proper to restore balance of network N2 and valve 17 is simultaneously adjusted.

The concurrent adjustments of valves 10 and 17 are in sense proper to oppose or reduce the change in temperature.

The resistances D concurrently adjustable in opposite senses, either manually or automatically as in copending application Serial No. 338,466 filed June 3, 1940, Patent No. 2,300,537, November 3, 1942, may be provided to effect return of temperature to a desired fixed magnitude throughout a wide variation of load.

As thus far described, upon an increase or decrease in temperature due to change in load or other conditions, the valves 10 and 17 are each adjusted to a position corresponding with or determined by the position of the control slidewire 1 which in turn corresponds with the new magnitude of temperature. Such variation of the rates of flow of fuel and air does not, however, ensure maintenance of desired or optimum fuel/air ratio throughout the range of variation of load or other conditions because of such variable factors as supply pressure and burner resistance and because also of the effects of differences in the flow characteristics of control valves.

To maintain a proper or desired relation between the rates of flow of fuel and air, there is utilized a flow metering device 22 which determines the sense and magnitude of an additional control voltage applied to the relay R2 or equivalent. When the movable core 23 of variable ratio transformer T is symmetrically positioned with respect to its secondary windings 24, 25, connected in series opposition, the voltages induced in them from the primary winding 26 are equal and opposite. Under this circumstance the relay R2 in series with windings 24 and 25 receives no excitation from transformer T.

If the fuel/air ratio is higher or lower than desired, the core 23 is correspondingly displaced from its neutral position and consequently transformer T impresses upon the relay R2 a voltage whose polarity (or phase) and magnitude depend respectively upon the sense and extent of displacement of core 23 from neutral position; the relay R2 accordingly receives from the transformer an excitation whose sense depends upon the sense of departure of core 23 from its neutral position, and the relay closes that circuit of the motor 21 which causes it to operate in sense to adjust valve 17 in sense corresponding with the sense of departure of core 23 and with the resultant sense of deflection of relay R2. The relay R2 under control of transformer T effects either opening or closing movement of valve 17, whichever is required to restore the proper fuel-air ratio.

To obtain proper phasing of the current in the primary winding 26, it may be necessary to connect inductance in series with it and/or capacitance in parallel with it.

A suitable flow metering device for positioning core 23 of transformer T comprises the pair of differential pressure devices FM and AM having flexible diaphragms 27, 28 dividing each of them into "high" and "low" pressure chambers connected, as by pipes 29, to the fuel and air conduits 30, 31 in advance of and beyond restrictions exemplified by orifice plates 32, 33. Diaphragm 27 is therefore subject to a differential pressure of magnitude dependent upon the rate of supply of fuel to the combustion chamber of the furnace and diaphragm 28 is subject to a differential pressure of magnitude dependent upon the rate of supply of air to that chamber.

The arm 34 which supports core 23 is attached to lever 35 which extends through a flexible chamber-sealing diaphragm of the fuel metering device FM. Pressure-responsive diaphragm 27 is suitably connected to the inner end of lever 35 which is pivotally supported on bearings located in the plane of the sealing diaphragm.

Similarly, the lever 36 is connected within the air metering device AM to the pressure-responsive diaphragm 28 and extends through the chamber-sealing diaphragm of the device. On the extension 37 of arm 36 is mounted the abutment 38 engaging an extension 51 of arm 34 and preferably adjustable to permit selection of different fuel-air ratios at which the differential forces impressed on the diaphragms 27, 28 are balanced insofar as positioning of core 23 is concerned.

When required, the connections to the metering devices FM, AM may be provided with restrictions, exemplified by valves 29A, to reduce or avoid overshooting of the secondary control action initiated by those devices. Optionally the movements of core 23 may be retarded as by dash-pot D1 or equivalent, for the same reasons. To obtain a proportional control action, the connection from core 23 to the movable dash-pot element or piston may include a spring and the leak through the piston should be adjustable.

It is also in many cases desirable to permit relay R2 to act in response to the output voltage of transformer T only at intervals so to avoid over-correction of the departure from optimum fuel/air ratio: an interrupter I for that purpose may be operated by a cam 50 continuously driven as by a component of mechanism 7. To prevent the interrupter action from interfering with control of valve 17 in response to adjustment of slidewire 8, the contacts of interrupter I are connected in parallel with the contact 58 of relay 57 energized concurrently with the motor 11 for valve 10. Thus whenever relay R1 effects energization of motor 11 to effect a change in the setting of fuel valve 10, the contact 58 of relay 57 moves to closed circuit position to permit relay R2 immediately to effect a corresponding change in the setting of valve 17.

The system of Fig. 1 may be modified or extended to provide for adjustment of one or more other control elements; for example, when conductors 59 and 60 as shown in Fig. 2 are applied, respectively, at 59 and 60 of Fig. 1, the stack damper 39 may be adjusted, in unison with slidewire 40 of network N3, by reversible motor 41 which is under control of relay R3 responsive both to unbalance of network N3 and to a control voltage, an excitation received from transformer T1, of sense and magnitude corresponding with departure from optimum of the difference between a pressure within the furnace and atmospheric pressure. Contacts 54, 55, 56 of relay R3 comprise a reversing switch suitably connected to motor 41 and a suitable source of current which may conveniently be the same source used for energization of motor 21 and the networks N, N2 and N3.

The arrangement for producing the latter control voltage includes transformer T1, similar in construction to transformer T above described, and a pressure-balance 42 comprising lever 34A to which is connected the core 23A of transformer T1 and the pressure-bells 43, 44 having their open ends below the level of liquid 45 and forming pressure chambers into which extend pipes 46, 47 extending to a furnace chamber and to atmosphere adjacent the furnace respectively.

Assuming omission of transformer T1 and of the droop-correction slidewires D, D stack damper 39 would move to different positions each corresponding with a particular temperature but the primary control action thus afforded would not ensure maintenance of the proper difference between furnace and atmospheric pressures.

By inclusion of Fig. 2 in the system of Fig. 1, upon change in temperature, the fuel and air valves and the stack damper are promptly moved under control of networks N, N2 and N3 to positions corresponding with the new condition thus to check or reduce further change and then, under control of transformers T and T1, the air valve and stack damper are respectively readjusted to provide the optimum fuel/air ratio and optimum furnace pressure.

For convenience and simplicity, all of networks N, N2, N3 may be energized from the same source AC of alternating current which supplies the transformers T and T1. Networks N2 and N3 may be provided with rheostats such as 52, 53 for varying the current traversing potentiometer slidewires 15 and 40 and thus adjusting the relationships which the primary positioning action tends to maintain.

Fig. 3 schematically represents a furnace supplied with fuel and air through aforesaid conduits 30 and 31 of Fig. 1, and provided with draft valve (stack damper) 39 and furnace-pressure tube 46 of Fig. 2.

Use of the invention is not limited to control of fuel and air valves, in response to temperature changes; in general, it comprehends the primary control of two or more independent variables in response to changes of a third, dependent variable and a supplemental control of the independent variables to maintain a predetermined relation between them independently of the different magnitudes of the third, dependent variable.

What I claim is:

1. A system for controlling the magnitude of a condition dependent upon the rates of supply of fluid agents comprising adjustable control members respectively determining the rates of flow of said agents, means for producing a difference of potential related to said magnitude of said condition and to the concurrent positions of said control members, reversible motive means for adjusting said difference of potential and the position of one of said control members in direction to reduce said difference of potential, electro-responsive means subjected to said difference of potential and controlling said motive means, a transformer whose output provides, in addition to said difference of potential, a reversible excitation for said electro-responsive means, and means for reversing the sense of excitation of said electro-responsive means by said transformer in response to departure of a ratio to each other of the rates of flow of said agents from a predetermined magnitude.

2. A system for controlling the magnitude of a condition dependent upon the rates of supply of fluid agents comprising adjustable control members respectively determining the rates of flow of said agents, means for producing a difference of potential dependent upon the magnitude of said condition and upon the concurrent positions of said control members, reversible motive means for adjusting said difference of potential and the position of one of said control members in a direction to reduce said difference of potential, electro-responsive means subjected to said difference of potential and controlling said motive means, a transformer whose output provides, in addition to said difference of potential, reversible excitation to said electro-responsive means, and means for changing the sense of application of excitation by said transformer to said electro-responsive means in response to change in a ratio to each other of said rates of flow of said agents.

3. A system for controlling the magnitude of a condition dependent upon supply of fluid agents comprising adjustable control members each determining the rate of flow of one of said agents, means for producing a difference of potential dependent upon the magnitude of said condition and upon the concurrent positions of said control members, reversible motive means for adjusting said difference of potential and the position of one of said control members in a direction to reduce said difference of potential, electro-responsive means subjected to said difference of potential and controlling said motive means, a transformer whose output provides, in addition to said difference of potential, reversible excitation to said electro-responsive means, means for changing the sense of application of said excitation by said transformer to said electro-responsive means in response to change in a ratio to each other of said rates of flow of said agents, a second reversible motive means for adjusting a second of said control members, and electro-responsive means controlling the second of the control members in response to changes in magnitude of said condition.

4. A system for controlling the magnitude of a condition dependent upon supply of agents comprising control members, at least one of which is adjustable, for controlling the ratio to each other of the rates of flow of said agents, a balanceable network including an impedance adjustable in accord with adjustment of said one control member, electro-responsive means subjected to a difference of potential related to said magnitude of said condition and dependent on unbalance of said network, reversible motive means for effecting rebalancing adjustment of said impedance and corresponding adjustment of said one control member, a transformer whose output provides, in addition to said difference of potential reversible excitation for said electro-responsive means, and means for reversing the sense of said excitation by said transformer to said electro-responsive means in dependence upon a ratio to each other of two of said rates of flow.

5. A system for controlling the magnitude of a condition dependent upon at least two fluid agents comprising control members respectively determining the rates of flow of said agents and the ratio to each other of said rates, a balanceable network including an impedance, means for adjusting said impedance in accord with the magnitude of said condition, a second impedance in said network, reversible motive means for adjusting said second impedance and one of said control members during unbalance of said network, a circuit including a portion of a third impedance and a portion of said second impedance, reversible motive means for adjusting said third impedance and a second of said control members, electro-responsive means controlling said second named motive means and subjected to a difference of potential between points on said second and third impedances respectively, a tranformer whose output provides, in addition to said difference of potential, reversible excitation to said second named responsive means, and means for reversing the sense of application of said excitation to said last named responsive means in response to departure of a ratio to each other of said rates of flow from a predetermined magnitude.

6. A system for controlling the magnitude of a condition dependent upon two fluid agents comprising control members respectively adjustable for primarily adjusting the rates of supply of said agents, a reversible motive means for adjusting each of said control members, an electro-responsive means for controlling each of said motive means, means for energizing each of said responsive means in dependence upon a difference of potential related to said magnitude of a condition and upon the concurrent positions of said control members, means for controlling the ratio to each other of said rates of supply comprising means for applying to one of said responsive means a reversible excitation in addition to said difference of potential, and means for reversing the sense of application of said excitation in response to departure of said ratio from a predetermined magnitude.

7. A system for controlling the magnitude of a condition dependent upon two fluid agents comprising control members respectively adjustable for primarily adjusting the rates of supply of said agents, a reversible motive means for adjusting each of said control members, an electro-responsive means for controlling each of said motive means, means for energizing each of said responsive means in dependence upon a difference of potential related to said magnitude of a condition and upon the concurrent positions of said control members, and means for in addition maintaining at a substantially fixed magnitude the ratio to each other of the primarily adjusted rates of supply of said agents comprising means for applying to one of said responsive means, in addition to said difference of potential, a reversible excitation, and means for reversing the sense of application of the excitation in response to departure of said ratio from aforesaid magnitude.

8. A furnace, means for supply thereto of streams of fuel and air, a control member for adjusting the rate of supply of each of them, reversible motive means for adjusting each of said members in opposite senses, means for producing differences of potential dependent upon the magnitude of a condition affected by combustion of the fuel, electro-responsive means respectively subjected to said differences of potential for respectively controlling said motive means, means for applying to one of said responsive means a reversible excitation in addition to the difference of potential to which said one of said responsive devices is subjected, and means for reversing the sense of application of said excitation in response to departure of the ratio of the rates of supply of the fuel and air from a predetermined magnitude.

9. A furnace, means for supply thereto of streams of fuel and air, a control member for adjusting the rate of supply of one of them, a control member for varying the furnace pressure, means for producing differences of potential dependent upon the varying magnitude of a condition affected by combustion of the fuel and upon the positions of said control members, electro-responsive means respectively subjected to said differences of potential for respectively controlling said motive means, means for applying to the responsive means controlling the motive means for said second named control member a reversible excitation in addition to the difference of potential to which said last-named responsive means is subjected, and means for determining the sense of said excitation in response to departure of the furnace pressure from a selected magnitude.

10. A system for controlling the magnitude of a condition dependent upon the rates of supply of fluid agents comprising adjustable control members respectively determining the rates of flow of said agents, means for producing a difference of potential dependent upon the concurrent relative positions of said control members, electro-responsive means subjected to excitation dependent upon said difference of potential, means for providing further effect upon said responsive means in addition to said first-named excitation comprising a transformer whose output provides reversible excitation, reversible motive means controlled by said responsive means for adjusting the position of at least one of said control members, and means responsive to change in the rate of flow of one of said agents for controlling the excitation provided by said transformer.

11. A system for controlling the magnitude of a condition dependent upon the rates of supply of fluid agents comprising adjustable control members respectively determining the rates of flow of said agents, means for producing a difference of potential dependent upon the concurrent relative positions of said control members, electro-responsive means subjected to excitation dependent upon said difference of potential, means for providing further effect upon said responsive means in addition to said first-named excitation comprising a transformer whose output provides reversible excitation, reversible motive means controlled by said responsive means for adjusting the position of at least one of said control members, and means responsive to departure of the ratio to each other of the rates of flow of said agents from a predetermined magnitude for controlling the excitation provided by said transformer.

EDWARD S. BRISTOL.

REFERENCES CITED

The following references are of record in the file of this patent:

UNITED STATES PATENTS

| Number | Name | Date |
|---|---|---|
| 1,975,085 | Dickey | Oct. 2, 1934 |
| 2,114,704 | Cunningham | Apr. 19, 1938 |
| 2,160,400 | Cunningham | May 21, 1939 |
| 1,886,575 | O'Connor | Nov. 8, 1932 |
| 1,523,414 | Gibson | Jan. 20, 1925 |
| 1,437,626 | Wilson | Dec. 5, 1922 |
| 1,767,588 | Hutton | June 24, 1930 |
| 2,072,442 | Collins | Mar. 2, 1937 |
| 2,339,289 | Olken | Jan. 18, 1944 |
| Re. 19,592 | Gibson | May 28, 1935 |
| 1,827,417 | Bristol | Oct. 13, 1931 |
| 2,105,686 | Cunningham | Jan. 18, 1938 |